US007426530B1

(12) United States Patent
Rosko et al.

(10) Patent No.: US 7,426,530 B1
(45) Date of Patent: Sep. 16, 2008

(54) SYSTEM AND METHOD FOR PROVIDING CUSTOMERS WITH SEAMLESS ENTRY TO A REMOTE SERVER

(75) Inventors: Robert Rosko, West Chester, PA (US); Kumar Ampani, Audubon, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/591,687

(22) Filed: Jun. 12, 2000

(51) Int. Cl.
*G06F 15/16* (2006.01)
(52) U.S. Cl. .................... 709/201; 709/224; 709/227; 707/203; 707/204
(58) Field of Classification Search ................ 709/203, 709/219, 226, 224, 232, 220, 227, 228, 225, 709/249, 204, 229, 201; 380/21, 25; 705/27, 705/10, 42; 713/201, 183; 707/4, 200, 203, 707/204; 370/252
See application file for complete search history.

(56) References Cited

U.S. PATENT DOCUMENTS

| | | |
|---|---|---|
| 3,705,385 A | 12/1972 | Batz |
| 3,860,870 A | 1/1975 | Furuya |
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |

(Continued)

FOREIGN PATENT DOCUMENTS

CA 2430549 6/2002

(Continued)

OTHER PUBLICATIONS

International Search Report dated Sep. 6, 2001, for PCT/US01/40911, Filed Jun. 12, 2001.

(Continued)

*Primary Examiner*—Khanh Dinh
(74) *Attorney, Agent, or Firm*—Hunton & Williams

(57) ABSTRACT

The present invention provides a seamless entry system that comprises a universal session manager. Users connect to the host service provider with a unique username and password. Then, through a series of data exchanges between the universal session manager, a validation database, and the remote service module, the customer may be transparently logged into remote service providers. Internet banking customers utilize a browser system to connect to a host server providing a range of banking services supported by a remote or distinct server. According to the method, the customer first enters a username and password to gain access to the host service provider. The universal session manager transmits data required for login to the remote service provider. The user is thus able to utilize the remote services with his/her web browser system without having entered a username or password particular to the remote service.

15 Claims, 5 Drawing Sheets

U.S. PATENT DOCUMENTS

| | | |
|---|---|---|
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,425,102 A | 6/1995 | Moy |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,485,370 A | 1/1996 | Moss et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,684,950 A | 11/1997 | Dare et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,742,683 A | 4/1998 | Lee et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A * | 7/1998 | Logan et al. ................. 707/200 |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. ................... 709/203 |
| 5,793,861 A | 8/1998 | Haigh |
| 5,794,178 A | 8/1998 | Caid |
| 5,794,207 A | 8/1998 | Walker et al. |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A * | 9/1998 | Teper et al. ................. 709/229 |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |

| | | | | | |
|---|---|---|---|---|---|
| 5,826,245 A | 10/1998 | Sandberg-Diment | 5,949,875 A | 9/1999 | Walker et al. |
| 5,826,250 A | 10/1998 | Trefler | 5,950,173 A | 9/1999 | Perkowski |
| 5,828,734 A | 10/1998 | Katz | 5,950,174 A | 9/1999 | Brendzel |
| 5,828,751 A | 10/1998 | Walker et al. | 5,950,206 A | 9/1999 | Krause |
| 5,828,812 A | 10/1998 | Khan et al. | 5,952,639 A | 9/1999 | Ohki |
| 5,828,833 A | 10/1998 | Belville et al. | 5,952,641 A | 9/1999 | Korshun |
| 5,832,211 A | 11/1998 | Blakely, III et al. | 5,953,710 A | 9/1999 | Fleming |
| 5,832,460 A | 11/1998 | Bednar | 5,956,695 A | 9/1999 | Carrithers et al. |
| 5,832,476 A | 11/1998 | Tada | 5,958,007 A | 9/1999 | Lee et al. ................. 709/219 |
| 5,835,087 A | 11/1998 | Herz | 5,960,411 A | 9/1999 | Hartman et al. |
| 5,835,580 A | 11/1998 | Fraser | 5,961,593 A | 10/1999 | Gabber et al. |
| 5,835,603 A | 11/1998 | Coutts | 5,963,635 A | 10/1999 | Szlam et al. |
| 5,838,903 A | 11/1998 | Blakely, III et al. | 5,963,915 A * | 10/1999 | Kirsch ..................... 705/26 |
| 5,838,906 A | 11/1998 | Doyle | 5,963,925 A | 10/1999 | Kolling et al. |
| 5,842,178 A | 11/1998 | Giovannoli | 5,963,952 A | 10/1999 | Smith |
| 5,842,211 A | 11/1998 | Horadan | 5,963,953 A | 10/1999 | Cram et al. |
| 5,844,553 A | 12/1998 | Hao | 5,966,695 A | 10/1999 | Melchione et al. |
| 5,845,259 A | 12/1998 | West et al. | 5,966,699 A | 10/1999 | Zandi |
| 5,845,260 A | 12/1998 | Nakano et al. | 5,967,896 A | 10/1999 | Jorasch et al. |
| 5,847,709 A | 12/1998 | Card | 5,969,318 A | 10/1999 | Mackenthum ............ 235/380 |
| 5,848,143 A | 12/1998 | Andrews | 5,970,143 A | 10/1999 | Schneier et al. |
| 5,848,400 A | 12/1998 | Chang | 5,970,470 A | 10/1999 | Walker et al. |
| 5,848,427 A | 12/1998 | Hyodo | 5,970,478 A | 10/1999 | Walker et al. |
| 5,852,812 A | 12/1998 | Reeder | 5,970,482 A | 10/1999 | Pham |
| 5,857,079 A | 1/1999 | Claus et al. | 5,970,483 A | 10/1999 | Evans |
| 5,862,223 A | 1/1999 | Walker | 5,978,467 A | 11/1999 | Walker et al. |
| 5,862,323 A | 1/1999 | Blakely, III et al. | 5,983,196 A | 11/1999 | Wendkos |
| 5,864,830 A | 1/1999 | Armetta et al. | 5,987,434 A | 11/1999 | Libman |
| RE36,116 E | 2/1999 | McCarthy | 5,987,454 A * | 11/1999 | Hobbs ....................... 707/4 |
| 5,866,889 A | 2/1999 | Weiss et al. | 5,987,498 A | 11/1999 | Athing et al. |
| 5,870,718 A | 2/1999 | Spector | 5,987,611 A * | 11/1999 | Freund ..................... 713/201 |
| 5,870,724 A | 2/1999 | Lawlor | 5,991,736 A | 11/1999 | Ferguson et al. |
| 5,870,725 A | 2/1999 | Belinger et al. | 5,991,738 A | 11/1999 | Ogram |
| 5,871,398 A | 2/1999 | Schneier et al. | 5,991,748 A | 11/1999 | Taskett |
| 5,873,072 A | 2/1999 | Kight | 5,991,751 A | 11/1999 | Rivette et al. |
| 5,873,096 A | 2/1999 | Lim | 5,991,780 A | 11/1999 | Rivette |
| 5,880,769 A | 3/1999 | Nemirofsky | 5,991,882 A | 11/1999 | O'Connell |
| 5,883,810 A | 3/1999 | Franklin et al. | 5,995,948 A | 11/1999 | Whitford |
| 5,884,032 A | 3/1999 | Bateman | 5,995,976 A | 11/1999 | Walker et al. |
| 5,884,270 A | 3/1999 | Walker et al. | 5,999,596 A | 12/1999 | Walker et al. |
| 5,884,272 A | 3/1999 | Walker et al. | 5,999,907 A | 12/1999 | Donner |
| 5,884,274 A | 3/1999 | Walker et al. | 6,000,033 A | 12/1999 | Kelly et al. |
| 5,884,288 A | 3/1999 | Chang | 6,001,016 A | 12/1999 | Walker et al. |
| 5,889,863 A | 3/1999 | Weber | 6,003,762 A | 12/1999 | Hayashida |
| 5,892,900 A | 4/1999 | Ginter et al. | 6,005,939 A | 12/1999 | Fortenberry et al. .......... 380/21 |
| 5,898,780 A | 4/1999 | Liu et al. ....................... 380/25 | 6,006,205 A | 12/1999 | Loeb et al. |
| 5,899,982 A | 5/1999 | Randle ....................... 712/229 | 6,006,249 A | 12/1999 | Leong |
| 5,903,881 A | 5/1999 | Schrader | 6,009,415 A | 12/1999 | Shurling et al. |
| 5,909,486 A | 6/1999 | Walker et al. | 6,009,442 A | 12/1999 | Chen et al. |
| 5,910,988 A | 6/1999 | Ballard | 6,010,404 A | 1/2000 | Walker et al. |
| 5,913,202 A | 6/1999 | Motoyama | 6,012,088 A | 1/2000 | Li et al. ..................... 709/219 |
| 5,914,472 A | 6/1999 | Foladare et al. | 6,012,983 A | 1/2000 | Walker et al. |
| 5,915,244 A | 6/1999 | Jack et al. | 6,014,439 A | 1/2000 | Walker et al. |
| 5,918,214 A | 6/1999 | Perkowski | 6,014,635 A | 1/2000 | Harris et al. |
| 5,918,217 A | 6/1999 | Maggioncalda | 6,014,636 A | 1/2000 | Reeder |
| 5,918,239 A | 6/1999 | Allen et al. ................. 707/526 | 6,014,638 A | 1/2000 | Burge et al. ................... 705/27 |
| 5,920,847 A | 7/1999 | Kolling et al. | 6,014,641 A | 1/2000 | Loeb et al. |
| 5,921,864 A | 7/1999 | Walker et al. | 6,014,645 A | 1/2000 | Cunningham |
| 5,923,763 A | 7/1999 | Walker et al. | 6,016,476 A | 1/2000 | Maes et al. |
| 5,926,796 A | 7/1999 | Walker et al. | 6,016,810 A | 1/2000 | Ravenscroft |
| 5,926,812 A | 7/1999 | Hilsenrath | 6,018,714 A | 1/2000 | Risen, Jr. |
| 5,930,764 A | 7/1999 | Melchione | 6,018,718 A | 1/2000 | Walker et al. |
| 5,933,816 A | 8/1999 | Zeanah | 6,023,698 A * | 2/2000 | Lavey et al. ................ 709/203 |
| 5,933,817 A | 8/1999 | Hucal | 6,024,640 A | 2/2000 | Walker et al. |
| 5,933,823 A | 8/1999 | Cullen | 6,026,398 A | 2/2000 | Brown et al. |
| 5,933,827 A | 8/1999 | Cole | 6,026,429 A | 2/2000 | Jones et al. ................. 709/201 |
| 5,940,812 A | 8/1999 | Tengel et al. | 6,026,491 A | 2/2000 | Hiles |
| 5,943,656 A | 8/1999 | Crooks | 6,032,134 A | 2/2000 | Weissman |
| 5,944,824 A | 8/1999 | He | 6,032,147 A | 2/2000 | Williams et al. |
| 5,945,653 A | 8/1999 | Walker et al. | 6,038,547 A | 3/2000 | Casto |
| 5,946,388 A | 8/1999 | Walker et al. | 6,038,552 A | 3/2000 | Fleischl et al. |
| 5,947,747 A | 9/1999 | Walker et al. | 6,041,357 A | 3/2000 | Kunzelman et al. |
| 5,949,044 A | 9/1999 | Walker et al. | 6,042,006 A | 3/2000 | Van Tilburg et al. |

| | | |
|---|---|---|
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon .................... 709/245 |
| 6,055,637 A | 4/2000 | Hudson et al. ............. 713/201 |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A * | 6/2000 | Subramaniam et al. ....... 726/19 |
| 6,085,168 A | 7/2000 | Mori et al. |
| 6,088,444 A | 7/2000 | Walker et al. |
| 6,088,451 A * | 7/2000 | He et al. .................... 713/201 |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,112,185 A | 8/2000 | Walker et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,139 A * | 12/2000 | Win et al. ................... 709/225 |
| 6,161,182 A | 12/2000 | Nadooshan |
| 6,164,533 A | 12/2000 | Barton |
| 6,170,011 B1 | 1/2001 | Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,185,689 B1 * | 2/2001 | Todd et al. .................. 713/201 |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,066 B1 | 3/2001 | Barkley et al. |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthal |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 * | 7/2001 | Donoho et al. ............. 709/204 |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,298,383 B1 * | 10/2001 | Gutman et al. ............. 709/229 |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,332,192 B1 | 12/2001 | Boroditsky et al. |
| 6,336,104 B1 | 1/2002 | Walker et al. |
| 6,343,279 B1 | 1/2002 | Bissonette et al. |
| 6,345,261 B1 | 2/2002 | Feidelson |
| 6,349,242 B2 | 2/2002 | Mahaffey |
| 6,349,336 B1 | 2/2002 | Sit et al. |
| 6,356,905 B1 * | 3/2002 | Gershman et al. ............. 707/10 |
| 6,363,381 B1 | 3/2002 | Lee et al. |
| 6,385,591 B1 | 5/2002 | Mankoff |
| 6,385,652 B1 | 5/2002 | Brown et al. |
| 6,401,211 B1 * | 6/2002 | Brezak et al. ............... 713/201 |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,453,353 B1 | 9/2002 | Win et al. |
| 6,460,141 B1 | 10/2002 | Olden |
| 6,487,641 B1 | 11/2002 | Cusson et al. |
| 6,490,601 B1 | 12/2002 | Markus et al. |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,505,238 B1 * | 1/2003 | Tran .......................... 709/208 |
| 6,507,912 B1 | 1/2003 | Matyas, Jr. et al. |
| 6,510,523 B1 | 1/2003 | Perlman et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,557,039 B1 | 4/2003 | Leong et al. |
| 6,580,814 B1 | 6/2003 | Ittycheriah et al. |

| | | | | | |
|---|---|---|---|---|---|
| 6,581,040 B1 | 6/2003 | Wright et al. | 2001/0054003 A1 | 12/2001 | Chien et al. |
| 6,584,505 B1 | 6/2003 | Howard et al. | 2002/0007313 A1 | 1/2002 | Mai et al. |
| 6,584,508 B1 | 6/2003 | Epstein et al. | 2002/0007460 A1 | 1/2002 | Azuma |
| 6,589,291 B1 | 7/2003 | Boag et al. | 2002/0010599 A1 | 1/2002 | Levison |
| 6,592,044 B1 | 7/2003 | Wong et al. | 2002/0010668 A1 | 1/2002 | Travis et al. |
| 6,606,606 B2 | 8/2003 | Starr | 2002/0018585 A1 | 2/2002 | Kim |
| 6,609,106 B1 | 8/2003 | Robertson | 2002/0019938 A1 | 2/2002 | Aarons |
| 6,609,113 B1 | 8/2003 | O'Leary et al. | 2002/0029269 A1 | 3/2002 | McCarty et al. |
| 6,609,125 B1 | 8/2003 | Layne et al. | 2002/0032613 A1 | 3/2002 | Buettgenbach et al. |
| 6,609,198 B1 | 8/2003 | Wood et al. | 2002/0032650 A1 | 3/2002 | Hauser et al. |
| 6,609,654 B1 | 8/2003 | Anderson et al. | 2002/0059141 A1 | 5/2002 | Davies et al. |
| 6,611,498 B1 * | 8/2003 | Baker et al. ............ 370/252 | 2002/0077978 A1 | 6/2002 | O'Leary et al. |
| 6,618,579 B1 | 9/2003 | Smith et al. | 2002/0087447 A1 | 7/2002 | McDonald et al. |
| 6,618,806 B1 | 9/2003 | Brown et al. | 2002/0095443 A1 | 7/2002 | Kovack |
| 6,623,415 B2 | 9/2003 | Gates et al. | 2002/0099826 A1 | 7/2002 | Summers et al. |
| 6,640,302 B1 * | 10/2003 | Subramaniam et al. ...... 713/169 | 2002/0104006 A1 | 8/2002 | Boate et al. |
| 6,668,322 B1 | 12/2003 | Wood et al. | 2002/0104017 A1 | 8/2002 | Stefan |
| 6,671,818 B1 * | 12/2003 | Mikurak ............ 714/4 | 2002/0107788 A1 | 8/2002 | Cunningham |
| 6,675,261 B2 | 1/2004 | Shandony | 2002/0152163 A1 | 10/2002 | Bezos et al. |
| 6,684,384 B1 | 1/2004 | Bickerton et al. | 2002/0165949 A1 | 11/2002 | Na |
| 6,687,222 B1 | 2/2004 | Albert et al. | 2002/0174010 A1 | 11/2002 | Rice, III |
| 6,687,245 B2 | 2/2004 | Fangman et al. | 2002/0184507 A1 | 12/2002 | Makower et al. |
| 6,691,232 B1 | 2/2004 | Wood et al. | 2002/0188869 A1 | 12/2002 | Patrick |
| 6,697,947 B1 | 2/2004 | Matyas, Jr. et al. | 2002/0191548 A1 | 12/2002 | Ylonen et al. |
| 6,711,610 B1 * | 3/2004 | Harris ............ 709/217 | 2002/0198806 A1 | 12/2002 | Blagg et al. |
| 6,714,987 B1 * | 3/2004 | Amin et al. ............ 709/249 | 2003/0001888 A1 | 1/2003 | Power |
| 6,718,482 B2 | 4/2004 | Sato et al. | 2003/0018915 A1 | 1/2003 | Stoll |
| 6,725,269 B1 | 4/2004 | Megiddo | 2003/0023880 A1 | 1/2003 | Edward et al. |
| 6,735,695 B1 | 5/2004 | Gopalakrishnan et al. | 2003/0026404 A1 | 2/2003 | Joyce et al. |
| 6,738,779 B1 | 5/2004 | Shapira | 2003/0034388 A1 | 2/2003 | Routhenstein et al. |
| 6,751,654 B2 | 6/2004 | Massarani et al. | 2003/0037131 A1 | 2/2003 | Verma |
| 6,754,833 B1 | 6/2004 | Black et al. | 2003/0037142 A1 | 2/2003 | Munger et al. |
| 6,755,341 B1 | 6/2004 | Wong et al. | 2003/0040995 A1 | 2/2003 | Daddario et al. |
| 6,763,468 B2 | 7/2004 | Gupta et al. | 2003/0046587 A1 | 3/2003 | Bheemarasetti et al. |
| 6,766,370 B2 | 7/2004 | Glommen et al. | 2003/0046589 A1 | 3/2003 | Gregg |
| 6,772,146 B2 | 8/2004 | Khemlani et al. | 2003/0051026 A1 | 3/2003 | Carter et al. |
| 6,785,810 B1 | 8/2004 | Lirov et al. | 2003/0055871 A1 | 3/2003 | Roses |
| 6,805,288 B2 | 10/2004 | Routhenstein et al. | 2003/0070069 A1 | 4/2003 | Belapurkar et al. |
| 6,819,219 B1 | 11/2004 | Bolle et al. | 2003/0070084 A1 | 4/2003 | Satomaa et al. |
| 6,820,202 B1 | 11/2004 | Wheeler et al. | 2003/0074580 A1 | 4/2003 | Knouse et al. |
| 6,826,696 B1 | 11/2004 | Chawla et al. | 2003/0079147 A1 | 4/2003 | Hsieh et al. |
| 6,832,202 B1 | 12/2004 | Schuyler et al. | 2003/0084345 A1 | 5/2003 | Bjornestad et al. |
| 6,847,991 B1 | 1/2005 | Kurapati | 2003/0084647 A1 | 5/2003 | Smith et al. |
| 6,856,970 B1 | 2/2005 | Campbell et al. | 2003/0088552 A1 | 5/2003 | Bennett et al. |
| 6,892,231 B2 | 5/2005 | Jager | 2003/0101116 A1 | 5/2003 | Rosko et al. |
| 6,907,566 B1 | 6/2005 | McElfresh et al. | 2003/0105981 A1 | 6/2003 | Miller et al. |
| 6,934,848 B1 | 8/2005 | King et al. | 2003/0110399 A1 | 6/2003 | Rail |
| 6,938,158 B2 | 8/2005 | Azuma | 2003/0115160 A1 | 6/2003 | Nowlin et al. |
| 6,950,936 B2 * | 9/2005 | Subramaniam et al. ...... 713/169 | 2003/0119642 A1 | 6/2003 | Gates et al. |
| 6,957,337 B1 | 10/2005 | Chainer et al. | 2003/0154403 A1 | 8/2003 | Keinsley et al. |
| 6,965,939 B2 | 11/2005 | Cuomo et al. | 2003/0159072 A1 | 8/2003 | Bellinger et al. |
| 6,976,164 B1 | 12/2005 | King et al. | 2003/0163700 A1 | 8/2003 | Paatero |
| 6,980,962 B1 | 12/2005 | Arganbright et al. | 2003/0163733 A1 | 8/2003 | Barriga-Caceres et al. |
| 6,992,786 B1 | 1/2006 | Breding et al. | 2003/0177067 A1 | 9/2003 | Cowell et al. |
| 7,010,512 B1 | 3/2006 | Gillin et al. | 2003/0191549 A1 | 10/2003 | Otsuka et al. |
| 7,023,862 B2 | 4/2006 | Saito et al. | 2004/0031856 A1 | 2/2004 | Atsmon et al. |
| 7,032,110 B1 | 4/2006 | Su et al. | 2004/0049702 A1 * | 3/2004 | Subramaniam et al. ...... 713/201 |
| 7,058,817 B1 * | 6/2006 | Ellmore ............ 713/183 | 2005/0080747 A1 | 4/2005 | Anderson et al. |
| 7,080,036 B1 | 7/2006 | Drummond et al. | 2005/0082362 A1 | 4/2005 | Anderson et al. |
| 7,089,208 B1 | 8/2006 | Levchin et al. | 2005/0086160 A1 | 4/2005 | Wong et al. |
| 7,089,503 B1 | 8/2006 | Bloomquist et al. | 2005/0086177 A1 | 4/2005 | Anderson et al. |
| 7,093,020 B1 | 8/2006 | McCarty et al. | 2005/0120180 A1 | 6/2005 | Schombach et al. |
| 7,117,239 B1 | 10/2006 | Hansen | | | |
| 7,124,101 B1 * | 10/2006 | Mikurak ............ 705/35 | FOREIGN PATENT DOCUMENTS | | |
| 7,137,006 B1 | 11/2006 | Grandcolas et al. | | | |
| 7,188,181 B1 | 3/2007 | Squier et al. | DE | 19731293 | 1/1999 |
| 7,225,249 B1 * | 5/2007 | Barry et al. ............ 709/227 | EP | 0855659 | 7/1998 |
| 7,343,495 B2 | 3/2008 | Kambayashi et al. | EP | 0884877 | 12/1998 |
| 2001/0011255 A1 | 8/2001 | Asay et al. | EP | 0917119 | 5/1999 |
| 2001/0012974 A1 | 8/2001 | Mahaffey | EP | 1014318 A2 | 6/2000 |
| 2001/0032184 A1 | 10/2001 | Tenembaum | EP | 1022664 | 7/2000 |
| 2001/0047295 A1 | 11/2001 | Tenembaum | EP | 1056043 | 11/2000 |
| 2001/0051917 A1 | 12/2001 | Bissonette et al. | EP | 1089516 | 4/2001 |

| | | |
|---|---|---|
| JP | H10187467 | 7/1998 |
| JP | 200324329 | 11/2000 |
| JP | 2001134672 | 5/2001 |
| WO | WO 97/43736 | 11/1997 |
| WO | WO 99/40507 A1 | 8/1999 |
| WO | WO 99/52051 | 10/1999 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 02/17082 A1 | 2/2002 |

OTHER PUBLICATIONS

Kutler, A Different Drummer on the Data Highway, American Banker, Section: No. 91, vol. 160, May 12, 1995, p. 14.
Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html, Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
Java, Banking on Java(TM) Technology, java.sun.com, May 21, 1999.
Bechtel Construction Operations Incorporated Standardizes on Primavera's Expedition Contract Management Software, Business Wire, Jul. 27, 1999.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, Apr. 199, p. 76-82.
Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep.-Oct. 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise Javabeans(TM) Technology: Server Component Model for the Java(TM) platform, java.sun.com, May 2, 1999.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com; printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Radosevich, Is Work Flow Working?, CNN.com, Apr. 6, 1999 at <http://www.cnn.com/TECH/computing/9904/06/workflow/ent.idg, p. 1 of 5, retrieved from the internet on Nov. 28, 2005.
Java, Java(TM) Technology in the Real World, java.sun.com, May 21, 1999.
Java, Java(TM) Remote Method Invocation (RMI) Interface, java.sun.com, May 32, 1999.
Java, Java(TM) Servlet API, java.sun.com, May 21, 1999.
OMG, Library, www.omg.com, May 25, 1999.
Method of Protecting Data on A Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.
Sirbu, et al, NetBill: An Internet Commerce System Optimized for Network Delivered Services, printed on Feb. 27, 1995.
Mitchell, Netlink Goes After An Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from http://web.archive.org/web20000226033405/www.omware.com/products.html, Retrieved from the interneet on Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB Mar. 1995, Order 95A, Mar. 1, 1995, pp. 245-248.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers By Engineers, Thomas Publishing Company, Apr. 26, 1999.
Java, Staying in Touch with JNDI, java.sun.com, May 21, 1999.
Summary of The At Your Request Architecture, First USA Bank Confidential and Proprietary, Apr. 2, 1999, pp. 1-8.

Temporary Global Passwords, IBM Corporation, IBM TDB v36, n3, Mar. 1993, Order 93A 60636, Mar. 1, 1993, pp. 451-454.
Java, The JDBC(TM) Data Access API, java.sun.com, May 21, 1999.
The check is in the email, Information Today, vol. 12, No. 3, ISSN: 8755-6286, Mar. 1995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Welcome to MUSE, Apr. 26, 1999.
OMG, Welcome to OMG's CORBA for Beginners Page!, www.omg.co, May 25, 1999.
OMG, What is CORBA!, www.omg.com, May 25, 1999.
Fujimura et al., XML Voucher: Generic Voucher Language, Feb. 2003.
eCharge, eCharge Corporation, www.echarge.com, Dec. 3, 1999.
Fusaro, Roberta, Builders Moving to Web tools Computerworld, Nov. 16, 1998, vol. 32, No. 46, pp. 51, 53.
Seibert, Paul, Facilities Planning & Design for Financial Institutions Bankline Publications, 1996, ISBN: 1-55738-780-X.
Owens, David, Facilities Planning & Relocation RSMeans, 1993, ISBN: 0-87629-281-3.
Larsen, Amy, Internet goes to Work for Builders, InterWeek, Nov. 16, 1998, Issue 741.
Frank, John N. Frank, Beyond Direct Mail, Credit Card Management, vol. 9, Iss. 5, Aug. 1996, 4pgs.
Primavera Systems Delivers Expedition Express, Business Wire, Feb. 23, 1999.
Deckmyn, Dominique, San Francisco manages $45M project via web-based Service, Computerworld, Aug. 9, 1999, vol. 33, No. 32, p. 14.
Mosig, Richard, Software Review: the Construction Project Manager Cost Engineering, Jan. 1996, vol. 38, No. 1, pp. 7-8.
Hernandez, Tomas et al., Software Solutions Building Design & Construction, Nov. 1999, vol. 40, No. 11, pp. 38-40.
Taylor, Telecommunications Demand Analysis in Transition, Proceedings of the 31st Hawaii International Conference on System Sciences, vol. 5, Jan. 6-9, 1998, pp. 409-415.
Temporary Global Passwords, IBM Corporation, IBM TDB v36, n3, Mar. 1993, Order 93A 60636, Mar. 1, 1993, pp. 451-454.
Cotts, David, The Facility Management Handbook Second Edition AMACM, 1998, ISBN: 0-8144-030-8.

* cited by examiner

Log In

Username: [          ]

Password: [          ]   Note: Passwords are case sensitive.

[ Log In ]   [ Reset ]

**Did you forget your username or password? Do you
need a new
username and password?**
For seamless access to your accounts, create a new user name and password using the same information (Social Security number, mother's maiden name, and birth date) that you used when you first registered.

Are you having trouble signing in?
If you're sure you're using the correct username and password, but you still can't log in, call
888-736-8611

Are you new?
Learn more about who we are and our products and services.

Attempts at unauthorized access, actual unauthorized access or use of this site s not permitted and constitutes a crime punishable by law (18 USC 1030). Individuals who attempt unauthorized transactions will be subject to criminal and/or civil prosecution. We reserve the right to view, monitor, and record activity on the system without notice or permission. Any information obtained by WingspanBank.com is subject to review by law enforcement organizations in connection with the investigation or prosecution of possible criminal activity on the system. If you are not an authorized user of this system or do not consent to continued monitoring, please exit the system at this time.

FIGURE 3A

SELECT USERNAME AND PASSWORD

To begin the selection process, please enter the information requested below, then click on the *Submit* button.

| | | |
|---:|---|---|
| SSN or Tax ID: | ☐ | 999-99-9999 or 999999999 |
| Mother's Maiden Name: | ☐ | |
| Date of Birth: | ☐ | MM/DD/YYYY or MMDDYYYY |

By submitting this request, I understand and agree I am bound by the terms and conditions that govern my Accounts

[ Submit ]  [ Reset ]

Please call 1-888-736-8611 to receive additional copies of the terms and conditions specific to your account.

MEMBER
FDIC  Lender

FIGURE 3B

SYSTEM AND METHOD FOR PROVIDING CUSTOMERS WITH SEAMLESS ENTRY TO A REMOTE SERVER

FIELD OF INVENTION

The present invention relates to a method that provides customers of a host service provider with a seamless experience, allowing them to access remote network services, which typically require their own username, password, and session management application, via a single login to the host service provider.

BACKGROUND OF THE INVENTION

A networked service provider may want to provide its customers with access to services that are not provided directly by its server. Therefore, the service provider may have to redirect its customer to another remote server capable of providing the service.

For example, an Internet banking site may wish to provide its customers with a full range of banking services, e.g., opening and maintaining a checking account, applying for a credit card or loan, paying bills, or accessing brokerage or financial planning services. Each of these Internet banking services may be provided by an independent server that requires the user to enter a unique username (or ID) and password. Therefore, when a customer wishes to utilize a banking service that is provided by a remote server, after the Internet banking host server redirects the customer to the remote service provider, the customer must enter a new ID and password specific to that service. Given the broad range of services that an Internet bank may wish to provide, this places the burden of remembering and entering multiple usernames and passwords on the Internet banking customer. This is a significant drawback to the customer. This is also a significant drawback to the Internet banking host because customer dissatisfaction may result in lost accounts.

Furthermore, if the customer returns to the host provider after accessing a remote service provider, and then desires to return to the remote service provider, the customer must re-enter the same username and password for that service. For example, in the Internet banking context, if a customer decides to access his or her checking account, then utilize brokerage services, and then desires to return to his or her checking account, the customer must enter his or her unique username and password for the checking account service twice. This is a significant drawback.

In addition, a host service provider may wish to change the remote service providers that customers can access through its server. In the Internet banking context, for example, a host Internet bank may utilize a particular remote service to provide its, customers with checking account services. For whatever reason, the host Internet bank may later wish to change the remote checking account service provider. This would require the Internet banking customer to create and remember a new username and password for the new remote service. Again, the burden of remembering an even greater number of IDs and passwords falls on the customer and the risk of losing those customers is borne by the host Internet bank. This is another significant drawback.

Other drawbacks to conventional approaches exist.

SUMMARY OF THE INVENTION

An object of the present invention is to overcome these and other drawbacks in existing systems and methods.

Another object of the present invention is to provide a specific time limit which a user can spend logged into the system.

Another object of the invention is to monitor the state of a user to determine whether the user is logged in or not.

Another object of the invention is to provide customers of a host service provider with a seamless experience enabling them to gain access to one or more remote service by entering a single username and password required by the host service provider.

Another object of the invention is to enable customers of a host service provider to regain access to a remote service provider, after having exited that remote server, without having to reenter the username and password required by that remote service provider.

Another object of the invention is to enable a host service provider to replace or add the remote services that a customer can access through the host service provider without placing the additional burden on customers to transpose a new username and password.

These and other objects of the invention are accomplished according to various embodiments of the invention. The present invention provides a seamless entry system that comprises a universal session manager. Users may connect to the host service provider with a unique username and password. Then, through a series of data exchanges, or handshakes, between the universal session manager, a validation database, and the remote service module, the customer may be transparently logged into remote service providers.

In one embodiment, the present invention may comprise a method providing customers of a host service provider with access to remote service providers which require their own unique user IDs and passwords. Internet banking customers, for example, may utilize a browser system to connect to a host server providing a range of banking services. These services may include on-line bill paying, instant credit card applications, loan applications, or checking account services. Each service may be supported by a remote or distinct server.

According to the method, the customer first enters a username and password to gain access to the host service provider. During the connection to the host service provider, a validation module validates the customer's username and primary password. If the combination is valid, the validation module transmits data to the universal session manager of the host service provider indicating which services the customer is enrolled in and the unique username and password that have been generated for each remote service in which the customer is enrolled. The customer is then free to select one of these services, which may be provided by a remote service provider. If an Internet banking customer, for example, chooses to complete a loan application and this service is provided by a remote server requiring its own user ID and password, the universal session manager then passes the required user ID and password to the remote server's login module.

After the remote service provider receives the data required for login, the remote server transmits to the universal session manager the status of the login attempt. If the login is successful, the user is thus able to utilize the remote services with his/her web browser system without having entered a username or password particular to the remote service.

In another embodiment, the present invention may comprise a method for providing customers of a host service provider with access to remote service providers which require their own unique user IDs and passwords and have other special access requirements. For example, an Internet banking customer may utilize a browser system to connect to a host server providing a range of banking services with special access requirements. These secure services may include brokerage services. If after entering a valid username and password to the host service provider the customer chooses to utilize a remote brokerage service provider with special access requirements, a trusted server will act as an intermediary between the universal session manager of the host service provider and the remote brokerage system, for example. The trusted server will answer the login request of the banking site's universal session manager with a session ID extracted from a cookie placed on the user's browser by the trusted server. When the universal session manager receives the session ID, the customer may be redirected to the remote brokerage site.

BRIEF DESCRIPTION OF THE DRAWINGS

FIGS. 3A and 3B depict an exemplary graphical user interface according to an embodiment of the present invention.

DETAILED DESCRIPTION OF THE PREFERRED EMBODIMENTS

For purposes of illustration, a system and method according to an embodiment of the present invention are described below. That system is described as being part of an Internet based system that enables customers of an Internet banking system to access remote Internet banking services, which may require a unique username and password, having only entered a single username and password required by the host Internet banking system. The invention is described in terms of an Internet based bank providing a multitude of financial services, some of which are provided by remote providers. However, this embodiment is exemplary only. The invention finds application in any scenario involving a host site that includes links to distinct remote sites with their own separate login procedures. It should also be appreciated that the present invention could be implemented through a variety of networked environments, such as the telephone network, a satellite connection network, or any other system that provides information to a user in networked fashion.

For purposes of clarity and simplicity, the invention is described in terms of the existing Internet. The skilled artisan will recognize that the invention could be implemented in variations thereto, such as the so-called Internet Protocol Next Generation (IPng) or any other variations of networked packet-switched technology.

Figure 1:
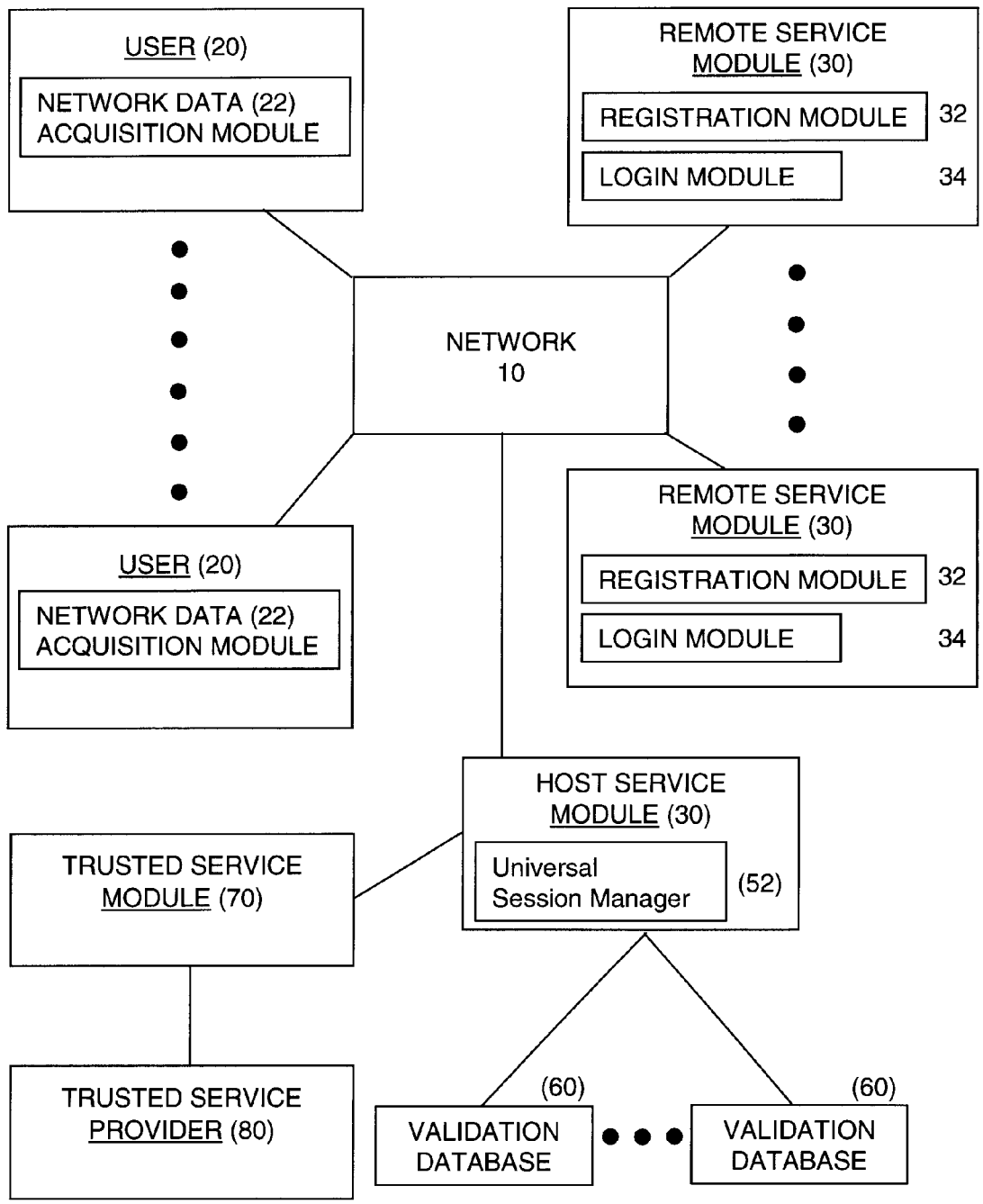
FIG. 1 depicts a schematic diagram of a system according to an embodiment of the present invention.

An embodiment of a system for implementing the methods disclosed below is depicted in FIG. 1. It should be understood that other embodiments for carrying out the present invention may also be provided. In the exemplary embodiment of FIG. 1, a plurality of users or customers 20 may be connected using networking technology 10 to a host service provider 50. In this embodiment, the customers 20 may connect to a host service provider 50 that is an Internet banking service site over the Internet 10, although the network may comprise a cable network, a LAN, a WAN, an intranet, the Supernet, or any other network that allows transmission of information.

Host service provider 50 may comprise a plurality of modules that function to perform the functions described above in addition to other functions set forth below. Although separate modules are described for performing these functions, it should be understood that additional modules may also be provided and that modules may be combined.

According to an embodiment of the invention, host service provider 50 may comprise a universal session manager 52 and a validation database 60. The universal session manager 52 may communicate with one or more databases 60 in communication with the host service provider 50. The database(s) 60 may store information required for login to remote sites or registration for the services those sites provide.

According to an embodiment, the remote service provider may comprise a registration module 32 and a login module 34.

A registration module 32 may receive data from the universal session manager 52 necessary for customer 20 registration with the remote service provider 30.

A login module 34 may communicate with the universal session manager to receive the information required for access to the remote service provider, e.g., username and password. The login module 34 may also reply to the universal session manager 52 indicating the status of the login request.

The system may also comprise a trusted service module 70 and a trusted service provider 80. The trusted service module 70 acts as an intermediary between the universal session manager 52 and the trusted service provider 80. The trusted service provider 80 is a remote service with special access requirements in addition to a unique username and password.

Figure 2A:
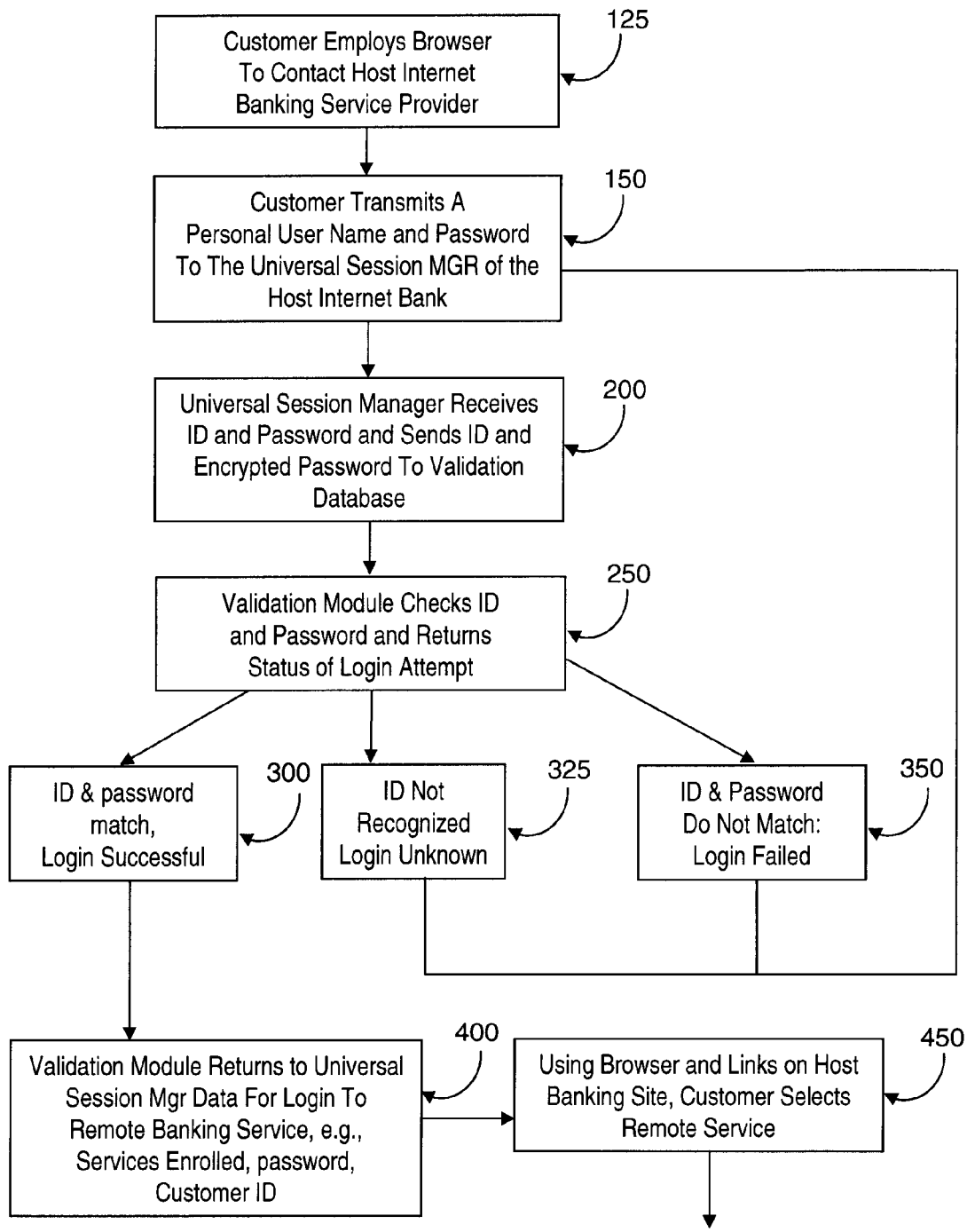
FIGS. 2A and 2B depict a flow diagram illustrating a method according to an embodiment of the present invention.
Figure 2B:
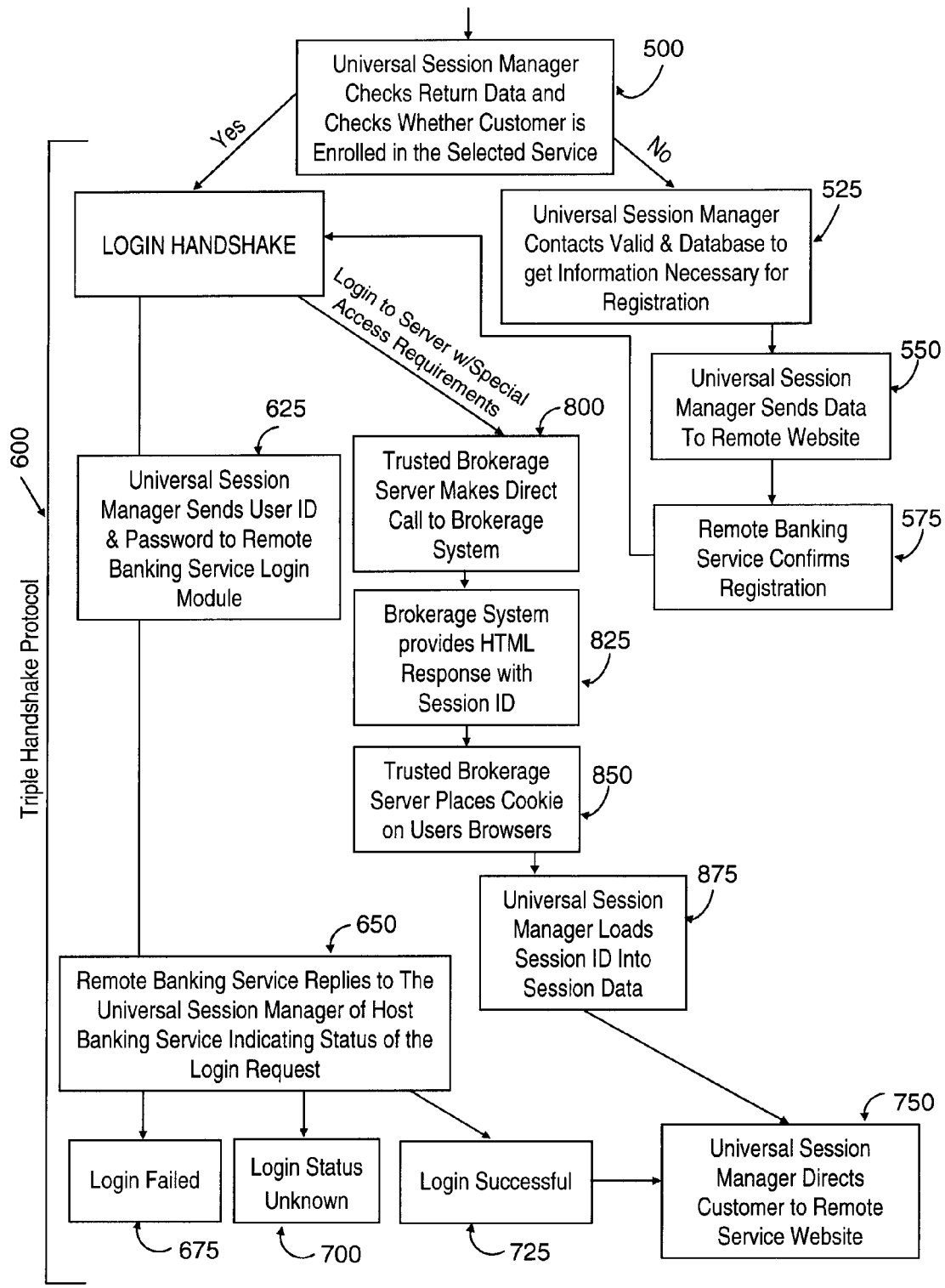

Referring now to the method depicted by FIGS. 2A and 2B, in step 125 the customer 20 employs a browser 22 to contact a host internet banking service provider 50. In step 150, a customer transmits a personal username and password to the universal session manager 52 of the host service provider 50. The host service provider 50 may comprise a server system connected over the World Wide Web or Internet 10 to provide web-pages upon request from one or more users utilizing a web browser 22. Accordingly, step 150 may comprise a customer using a browser 22 to connect over the Internet 10 to a web-site that provides Internet banking services, for example. Use of exiting browser/server technology may be used to transmit the username and password to the host service provider 50.

In response to the customer's transmitting a username and password to the universal session manager 52, in step 150, the universal session manager 52 of the host service provider 50 transmits the username and an encrypted version of the password to the validation database 60, as in step 200. In step 250, the validation module checks to make sure that the user has entered a valid username/password combination. If the username is not recognized by the validation module, as in step 325, or if the username and password do not match, as in step 350, the user will be asked to re-enter his or her username and password, as in step 150. The customer 20 of the Internet banking system 50 of FIG. 1 may be allowed three attempts to enter a correct username/password combination. Once the customer 20 has entered a valid login 300, the database 60 will return to the universal session manager 52 the information necessary for the transparent login to the remote service 30, as in step 400. As previously described, the information may comprise the type of the Internet banking services in which the customer 20 is enrolled and/or the user ID particular to that user and required by a remote banking service web site. The information may also include identifying information necessary e-mail. Additionally, the information may include data necessary for profiling a dynamic application form related to user-selected products and services.

In step 450, the customer may select a link to one of the remote services 30 provided through the host service provider 50. In the present embodiment, for an Internet based banking system, these services may include checking account maintenance, credit card and loan applications services, electronic bill paying, and brokerage services. These services may also include Internet search engines, other web sites that offer membership services, e-mail services, or campaign advertising.

In step 500, the universal session manager 52 checks the validation database 60 return data to see of the customer has enrolled in the service. If the customer is enrolled in the selected service, the present embodiment initiates the triple handshake protocol 600. In the first step 625 of the triple handshake protocol 600, the universal session manager 52 may send the required customer username and password to the login module 34 of the remote service provider. This may comprise the universal session manager 52 of an Internet banking service provider 50 sending redirects to remote service web sites 30, which may include on-line checking, on-line brokerage, on-line credit card application or online bill paying sites.

In the second step 650 of the triple handshake protocol 600, the login module 34 of the remote service module 30 sends the universal session manager 52 a reply indicating the status of the login request. The status may indicate that the login attempt to the remote service provider 30 was successful 725, that the login attempt failed 675, or that the customer has never registered for the service before, i.e., is unknown 700. This step may comprise the login module 34 sending redirects over the Internet 10 to the universal session manager 52 of the host Internet banking provider's web site 50.

In the final step of the triple handshake protocol 750, the universal session manager 52 directs the customer to the remote service provider 30. In the present embodiment, this may comprise the universal session manager 52 of an Internet banking web site 50 redirecting the customer to the selected remote services' web site 30.

The information may be displayed to the customer as depicted in FIG. 3. The Internet banking host service provider may have control of the outer frame and the top navigational bar. The various services' web pages will be hosted in the main bottom panel and may contain a left-hand navigation bar for local remote service navigation.

In step 500, if the universal session manager 52 determines that the customer is not registered for the selected service the universal session manager 52 will transparently register the customer for that service. Transparent registration may require that the universal session manager 52 contact the validation database 60 to retrieve the information necessary for registration, as in step 525. This may include providing a unique username and password designated for use only with the selected service. Then the universal session manager 52 sends data to the registration module 32 of the remote service provider's web site, as in step 550. The remote service 30 then confirms the customer's registration, as in step 575. Then, the universal session manager 52 initiates the triple handshake protocol 600. In the present embodiment, transparent registration may be accomplished by a series of redirects between the universal session manager 52, the validation database 60, and the registration module 32 of the remote service provider 30.

In another embodiment of the present invention, the customer may choose an Internet banking service, e.g., a brokerage service, that has special access requirements in addition to a unique username and password. If the customer is enrolled in the selected service, the present embodiment initiates trusted server dedicated line redirection.

In step 800, the trusted service module 70 makes a direct call to the trusted service provider 80. This may comprise a trusted brokerage server 70 established by an Internet banking service 50 providing a secure brokerage service 80 with the login redirects over a dedicated line.

In step 825, the trusted service provider 80 responds to the trusted service module 70 in the form of an html response with a session ID associated with it. This may comprise a brokerage system 80 responding to a trusted brokerage server 70 in html form over a dedicated line.

The trusted service module 70 will send this "cookie" to the user's network data acquisition module 22, after reading the Session "cookie" and extracting sessionID. This may comprise a trusted brokerage server 70 placing this "cookie" on the customer's Internet browser 22.

The trusted service module 70 next answers the universal session manager 52 with the status of the login attempt and the sessionID extracted from the cookie. Once the universal session manager 52 receives this data, if the login attempt was successful, the customer will be directed to the trusted service provider 80, as in step 750. This may comprise, the universal session manager 52 of an Internet banking service provider 30 receiving data from a trusted brokerage server 70 and then redirecting the Internet banking customer 20 to a brokerage service provider 80.

During a session, if a customer 20 remains logged in, but no activity occurs, the universal session manager 52 performs a data security function by causing customer 20 to automatically logout. In a preferred embodiment, this timeout occurs after about thirty minutes of inactivity.

FIGS. 3A and 3B provide an exemplary graphical user interface. FIG. 3A illustrates a screen that may be provided when a user 20 initially attempts to access host server 50. The user 20 is prompted to enter a user name and password, or alternatively to create a new user name and password to be granted seamless access to pertinent applications.

If the user 20 elects to create a new user name and password, access is granted upon the user's submission of data requested in FIG. 3B.

Additional advantages and modifications will readily occur to those skilled in the art. Therefore, the invention in its broader aspects is not limited to the specific details in representative devices shown and described herein. Accordingly, various modifications may be made without departing from the spirit and scope of the general inventive concept as defined by the appended claims.

What is claimed is:

1. A method for providing accessibility to a plurality of remote service providers across a network via a single login to a host service provider, each of the plurality of remote service providers being accessible through the host service provider and each of the plurality of remote service providers having separate login procedures requiring data, the method comprising the steps of:

the host service provider receiving the single login from a user, the host service provider having a universal session manager;

the universal session manager retrieving data from a validation database based on the single login to the host service provider, wherein the data is effective for accessing a selected one of the plurality of remote service providers, and wherein the data is based at least in part on the single login;

the universal session manager transmitting said data to the remote service provider, the universal session manager and the remote service provider exchanging the data to effect a two-sided authentication; and the host service provider directing the user to the remote service provider in such manner that the user is simultaneously presented with information, in a single graphical user interface, that is provided by both the host service provider and the remote service provider; and connecting to a trusted service provider having special access requirements, wherein a trusted service module acts as an intermediary between the host service provider and die trusted service provider; and wherein the trusted service module receives a sessionID from the trusted service provider;

wherein the trusted service module places a text file on the user's network data acquisition module; and wherein said text file comprises a cookie;

the method further comprising the step of registering the user with the remote service provider; and wherein the two-sided authentication is a triple handshake, the triple handshake including:
the universal session manager sending a username and password to the remote service provider constituting a login request;
the remote service provider sending the universal session manager a reply to the login request; and
the universal session manager directing the user to the remote service provider; and wherein the remote service provider is a distinct remote site from the host service provider, and each step of the triple handshake is effected directly between the universal session manager and the remote service provider.

2. A system for providing accessibility to a plurality of remote service providers via a single login to a host service provider, each of the plurality of remote service providers being accessible through the host service provider and each of the plurality of remote service providers having separate login procedures requiring data, the system comprising:

a user system having a network data acquisition module;

a plurality of remote service providers;

a host service provider for receiving the single login, the host service provider having a universal session manager;

the universal session manager receiving data from a validation database based on the single login to the host service provider, the universal session manager passing the data, which is required for access to the remote service provider, directly to the remote service provider, the universal session manager and the remote service provider exchanging the data to effect a two-sided authentication, the two-sided authentication being performed directly between the universal session manager and the remote service provider; and the validation database for storing the data for accessing the remote service provider, the universal session manager communicating with the validation database to obtain the data; and wherein the host service provider directs the user to the selected one of the plurality of remote service providers using the data; and the host service provider directing the user to the remote service provider in such manner that the user is simultaneously presented with information, in a single interface, that is provided by both the host service provider and the remote service provider; and said validation database further storing information for registering the user with the remote service provider; and the system further comprising a trusted service module that serves as an intermediary between the host service module and a trusted service provider, wherein said trusted service provider is a remote service provider with special access requirements, wherein the network data acquisition module is an Internet browser, wherein the remote service provider further comprises a registration module and a login module:
wherein the login module receives the data for gaining access to the services provided by the remote service provider; and
wherein the registration module receives the data for registering a user with the remote service provider; and the universal session manager registering the user with the remote service provider; and wherein the two-sided authentication is a triple handshake, the triple handshake being performed by:
the universal session manager sending a username and password to the remote service provider constituting a login request;
the remote service provider sending the universal session manager a reply to the login request; and
the universal session manager directing the user to the remote service provider; and wherein the remote service provider is a distinct remote site from the host service provider, and each step of the handshake is effected directly between the universal session manager and the remote service provider.

3. The method of claim 1, wherein the validation database transmits data go the universal session manager or the host service provider indicating which services the user is enrolled.

4. The method of claim 1, wherein the host service provider receiving the single login from the user is performed over a network.

5. The system of claim 2, wherein the validation database transmits data to the universal session manager of the host service provider indicating which services the user is enrolled.

6. The method of claim 1, wherein the host service provider has control of a navigation bar in the graphical user interface, and web pages from the remote service provider are hosted in the graphical user interface and contain a navigation bar.

7. The method of claim 1, the information that that is provided by the host service provider is adjacent the information that is presented by the remote service provider.

8. The method of claim 1, further including the host service provider presenting the user with information, simultaneously to the remote service provider presenting the user with information, both such information being displayed to the user in respective areas of the single graphical user interface.

9. The method of claim 1, further including the host service provider presenting the user with information in a first area of the single graphical user interface, simultaneously with the remote service provider presenting the user with information in a second area of the single graphical user interface.

10. The method of claim 9, in which:
the first area of the single graphical user interface is an outer frame of the single graphical user interface; and
the second area of the single graphical user interface is a main bottom panel.

11. The method of claim 9, in which:
the first area of the single graphical user interface is an outer frame and top navigational bar of the single graphical user interface; and
the second area of the single graphical user interface is a main bottom panel and a left-hand navigation bar of the single graphical user interface.

12. The method of claim 11, the host service provider controlling the first area, and the left-hand navigation bar in the second area providing the user with remote service navigation.

13. A method for providing accessibility to a plurality of remote service providers across a network via at single login to a host service provider, each of the plurality of remote service providers being accessible through the host service provider and each of the plurality of remote service providers having separate login procedures requiring data, the method comprising the steps of:
- the host service provider receiving the single login from a user, the host service provider having a universal session manager;
- the universal session manager retrieving data from a validation database based on the single login to the host service provider, wherein the data is effective for accessing a selected one of the plurality of remote service providers, and wherein the data is based at least in part on the single login;
- the universal session manager transmitting said data to the remote service provider, the universal session manager and the remote service provider exchanging the data to effect a two-sided authentication; and
- the host service provider directing the user to the remote service provider in such manner that the user is simultaneously presented with information, in a single graphical user interface, that is provided by both the host service provider and the remote service provider; and
- connecting to a trusted service provider having special access requirements, wherein a trusted service module acts as an intermediary between the host service provider and the trusted service provider; and
- wherein the trusted service module receives a sessionID from the trusted service provider;
- wherein the trusted service module places a text file on the user's network data acquisition module; and
- wherein said text file comprises a cookie;
- the method further comprising the step of registering the user with the remote service provider; and
- wherein the two-sided authentication is a triple handshake, the triple handshake including:
  - the universal session manager sending a username and password to the remote service provider constituting a login request;
  - the remote service provider sending the universal session manager a reply to the login request; and
  - the universal session manager directing the user to the remote service provider; and
- wherein the remote service provider is a distinct remote site from the host service provider, and each step of the triple handshake is effected directly between the universal session manager and the remote service provider.

14. The method of claim 13, further including the universal session manager registering the user with the remote service provider.

15. The method of claim 1, wherein the universal session manager retrieving data from a validation database based on the single login to the host service provider includes the universal session manager transmitting the username and an encrypted version of the password to the validation database.

* * * * *